Oct. 11, 1932.  C. T. HATCH  1,881,549

POWDERING MACHINE

Filed May 26, 1930  2 Sheets-Sheet 1

INVENTOR
Charles T. Hatch
BY
Chappell & Earl
ATTORNEYS

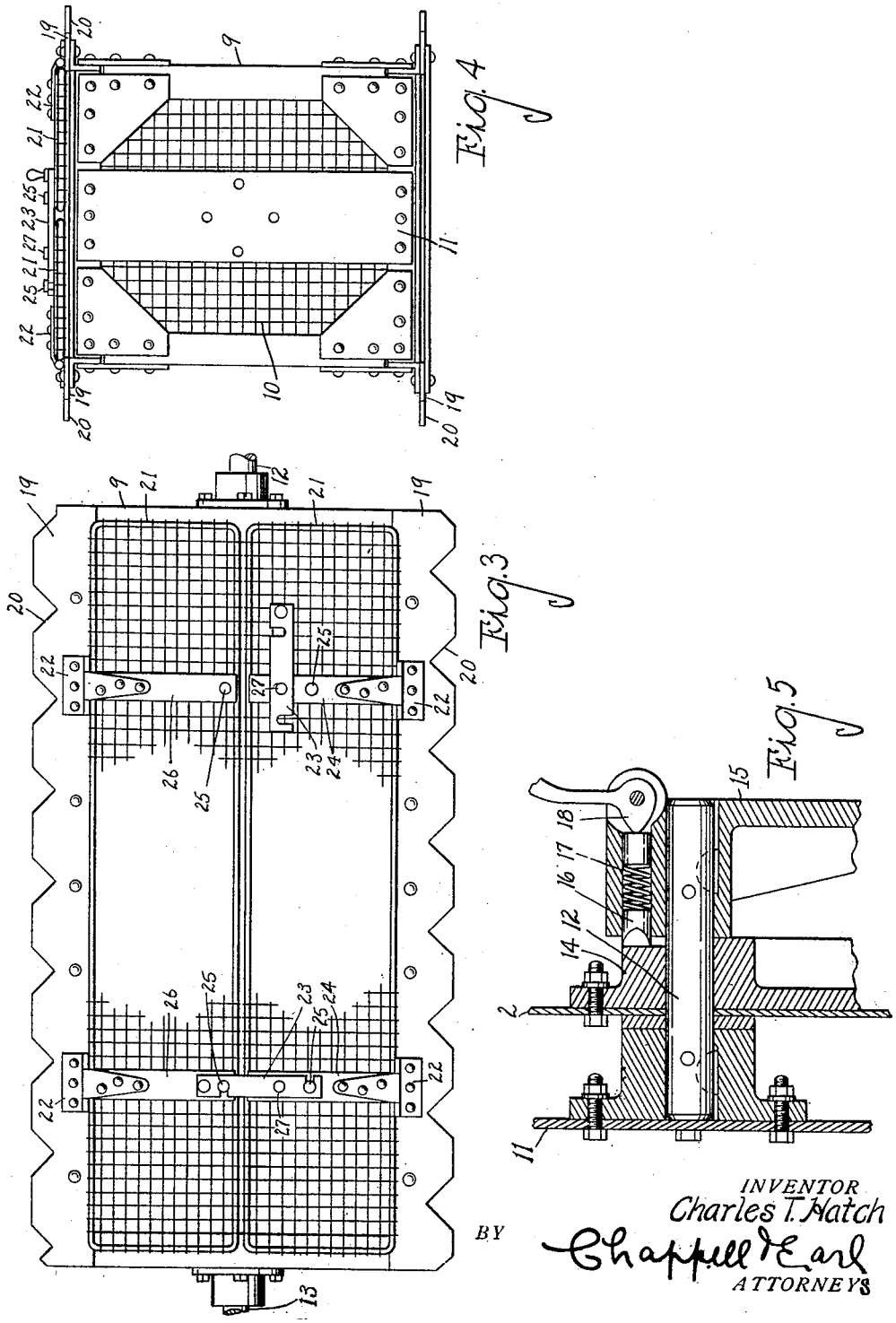

Patented Oct. 11, 1932

1,881,549

UNITED STATES PATENT OFFICE

CHARLES T. HATCH, OF ALBION, MICHIGAN, ASSIGNOR TO UNION STEEL PRODUCTS COMPANY, OF ALBION, MICHIGAN

POWDERING MACHINE

Application filed May 26, 1930. Serial No. 455,920.

The main objects of this invention are to provide a powdering machine for doughnuts and the like which is of large capacity, does not injure the doughnut or other product treated and is very convenient to operate.

Objects relating to details and economies of my invention will appear from the description to follow. The invention is defined and pointed out in the claims.

A structure which is a preferred embodiment of my invention is illustrated in the accompanying drawings, in which:

Fig. 3 is a plan view of the holder and container removed from the tank or receptacle.

Fig. 4 is an end elevation looking from the right of Fig. 3.

Fig. 5 is an enlarged fragmentary view partially in vertical section on line 5—5 of Fig. 2.

Figure 2:
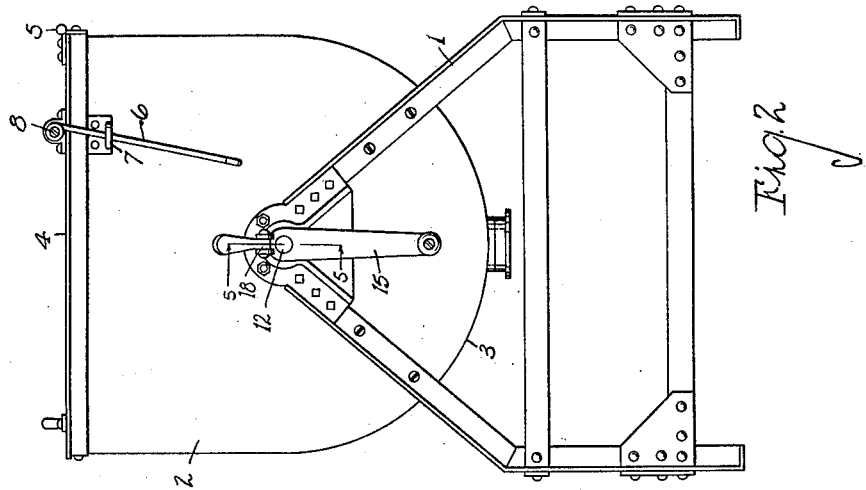
Fig. 2 is an end elevation looking from the right of Fig. 1.
Figure 1:
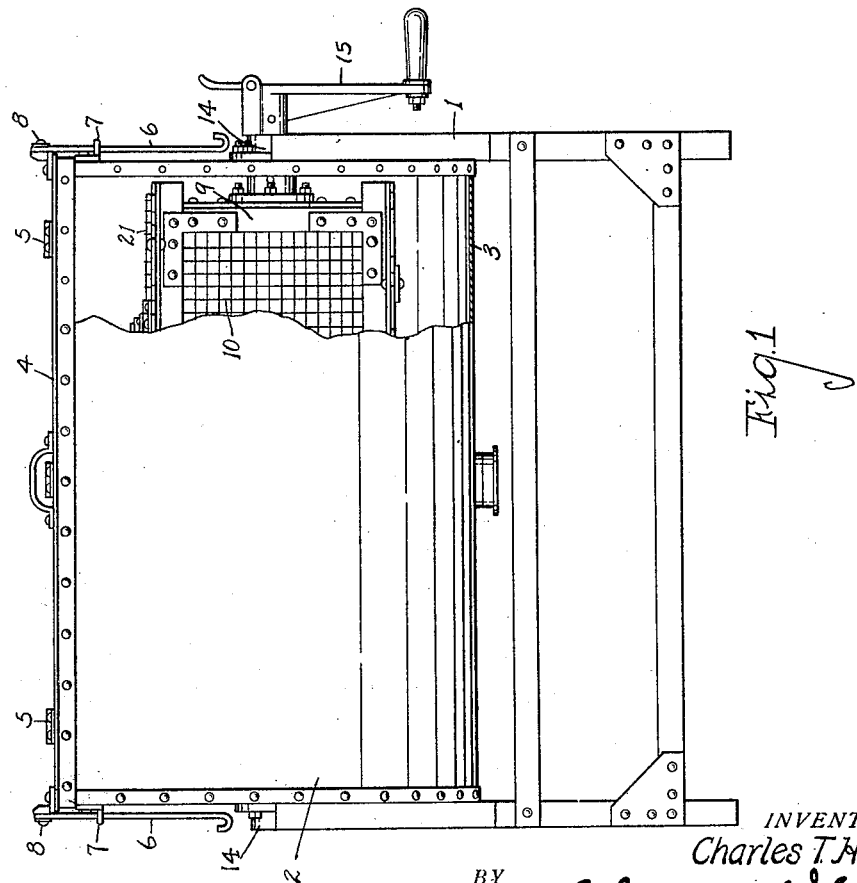
Fig. 1 is a fragmentary side elevation of a powdering machine embodying the features of my invention.

Referring to the drawings, I provide a frame designated generally by the numeral 1 built up of angle iron to support the operating parts. On this frame I mount a receptacle 2 having a transversely curved bottom 3, the bottom merging into the side walls of the receptacle.

The receptacle is provided with a cover 4 hinged at 5. A link 6 slidably disposed through the ear 7 and pivoted to the cover at 8 serves to hold the cover in its open position.

Within the receptacle I mount a frame-like holder 9 adapted to receive the foraminated container 10. This holder is provided with end members 11 on which are the journals 12 and 13, these journals being arranged in bearings 14 on the frame. The journal 12 is provided with a crank 15 by means of which the holder may be rotated.

A dog 16 is provided for holding the holder in upright position, this dog being mounted in a bore 17 in the hub of the crank and held in engaging position by means of the cam 18—see Fig. 5. When this cam is thrown out of engaging position, the dog yields to permit the rotation of the crank.

The holder is provided with blades 19 at its corners, these blades preferably having notches or serrations 20 in the edges thereof as illustrated, the notches of adjacent blades being arranged out of alignment. These blades are mounted so that they sweep across the curved bottom of the receptacle, picking up the powdered sugar or the like and discharging it upon the contents of the container through the foraminate walls thereof.

The holder has foraminate cover members 21 hinged thereon at 22 and provided with latches 23 pivoted on the straps 24 of one of the members to engage the headed studs 25 on the straps 26 of the other member. These catches 23 are pivoted at 27 and have laterally opening notches to engage the studs.

The containers 10 are freely removable when the covers are opened, a number of containers being preferably provided in practice so that they may be filled and emptied by operators other than the one manipulating the machine.

In handling articles such as cakes and doughnuts, for instance, the containers should be filled to substantial capacity as it is not desired that the contents be tumbled about as in certain types of powdering machines, the powdering material in this machine being dipped up and discharged upon the contents of the containers by the blades in the holder as it is rotated.

Machines embodying my invention are of very large capacity, easy to operate and, as stated, the articles are powdered without unduly subjecting the articles to a tumbling-barrel action.

Having thus described my invention, what I claim as new and desire to secure by Letters Patent, is:

1. In a powdering machine, the combination with a frame, of a stationary trough-like receptacle having a transversely curved bottom mounted on said frame, a rectangular frame-like container holder within said receptacle, journals for said holder projecting through the ends of said receptacle and rotatably supported on said frame, one of said journals being provided with a crank, projecting blades at the angles of said container adapted to sweep across the curved bottom portion of said receptacle as the holder is rotated, a dog on said crank for holding said holder in upright position, and a foraminate container removably mounted in said holder.

2. In a powdering machine, the combination with a frame, of a stationary trough-like receptacle having a transversely curved bottom mounted on said frame, a rectangular frame-like container holder within said receptacle, journals for said holder projecting through the ends of said receptacle and rotatably supported on said frame, projecting blades at the angles of said container adapted to sweep across the curved bottom portion of said receptacle as the holder is rotated, and a foraminate container mounted in said holder.

3. In a powdering machine, the combination with a frame, of a receptacle having a transversely curved bottom mounted on said frame, a rectangular frame-like container holder within said receptacle, journals for said holder projecting through the ends of said receptacle and rotatably supported on said frame, projecting blades at the angles of said container adapted to sweep across the curved bottom portion of said receptacle as the holder is rotated, said blades having notched edges, the notches of adjacent blades being disposed out of alignment, means for holding said holder in upright position, and a foraminate container removably mounted in said holder.

4. In a powdering machine, the combination with a frame, of a receptacle, a rectangular frame-like container holder within said receptacle, journals for said holder projecting through the ends of said receptacle and rotatably supported on said frame, projecting blades at the angles of said container, means for rotating said holder, a foraminate container removably mounted in said holder, a foraminate cover for said container comprising oppositely swinging sections hinged to said holder, and latches for securing said sections together, said cover constituting means for retaining said container within said holder.

5. In a powdering machine, the combination with a frame, of a stationary receptacle having a transversely curved bottom mounted on said frame, a rectangular frame-like container holder within said receptacle, journals for said holder projecting through the ends of said receptacle and rotatably supported on said frame, projecting blades at the angles of said container adapted to sweep across the curved bottom portion of said receptacle as the holder is rotated, means for rotating said holder, means for holding said holder in upright position, and a foraminate container removably mounted in said holder.

6. In a powdering machine, the combination of a receptacle, a frame-like container holder rotatably mounted within said receptacle, projecting blades on said container holder, means for rotating said holder, a foraminate container removably mounted in said holder, a foraminate cover for said container comprising oppositely swinging sections hinged to said holder, and latches for securing said sections together, said cover constituting means for retaining said container within said holder.

7. In a powdering machine, the combination of a receptacle, a frame-like container holder rotatably mounted within said receptacle, projecting blades on said container holder, means for rotating said holder, a foraminate container removably mounted in said holder, and a foraminate cover for said container mounted on said holder and constituting means for removably retaining said container within the holder.

8. In a powdering machine, the combination of a stationary trough-like receptacle provided with a transversely curved bottom, a rectangular frame-like holder rotatably mounted within said receptacle and provided with blades at the angles thereof adapted to sweep across the curved portion of the receptacle as the holder is rotated, and a foraminate container mounted in said holder.

In witness whereof I have hereunto set my hand.

CHARLES T. HATCH.